(12) United States Patent
Jakobsen

(10) Patent No.: US 7,681,457 B2
(45) Date of Patent: Mar. 23, 2010

(54) MICROMECHANICAL PRESSURE SENSING DEVICE

(75) Inventor: Henrik Jakobsen, Horten (NO)

(73) Assignee: Infineon Technologies Sensonor AS, Horten (NO)

( * ) Notice: Subject to any disclaimer, the term of this patent is extended or adjusted under 35 U.S.C. 154(b) by 37 days.

(21) Appl. No.: 12/015,175

(22) Filed: Jan. 16, 2008

(65) Prior Publication Data
US 2008/0178680 A1    Jul. 31, 2008

(30) Foreign Application Priority Data
Jan. 31, 2007    (EP)    ................................. 07101491

(51) Int. Cl.
*G01L 9/06*    (2006.01)
(52) U.S. Cl. .............................. 73/721; 73/715; 73/727; 361/283.4
(58) Field of Classification Search ........... 73/700–756; 361/283.1–283.4
See application file for complete search history.

(56) References Cited

U.S. PATENT DOCUMENTS

| | | | | |
|---|---|---|---|---|
| 3,697,918 A | * | 10/1972 | Orth et al. ........................ 338/3 |
| 4,023,562 A | * | 5/1977 | Hynecek et al. ............. 600/561 |
| 4,141,253 A | * | 2/1979 | Whitehead, Jr. ............... 73/727 |
| 4,173,900 A | * | 11/1979 | Tanabe et al. .................. 73/727 |
| 4,291,293 A | * | 9/1981 | Yamada et al. ................ 338/4 |
| 4,327,350 A |   | 4/1982 | Erichsen |
| 4,899,125 A | * | 2/1990 | Kurtz .............................. 338/2 |
| 5,163,328 A | * | 11/1992 | Holland et al. ................ 73/717 |
| 5,209,122 A | * | 5/1993 | Matly et al. .................... 73/727 |
| 5,255,427 A | * | 10/1993 | Hafner ....................... 29/621.1 |
| 5,345,815 A | * | 9/1994 | Albrecht et al. ................ 73/105 |
| 5,591,679 A |   | 1/1997 | Jakobsen et al. |
| 6,000,280 A | * | 12/1999 | Miller et al. ................... 73/105 |
| 6,006,607 A | * | 12/1999 | Bryzek et al. ................. 73/727 |
| 6,062,088 A | * | 5/2000 | Ingrisch et al. ............... 73/727 |
| 6,073,484 A | * | 6/2000 | Miller et al. ................... 73/105 |
| 6,319,729 B1 |   | 11/2001 | Kvisteroey et al. |
| 7,290,453 B2 | * | 11/2007 | Brosh ............................. 73/720 |
| 7,311,009 B2 | * | 12/2007 | Kotovsky ....................... 73/777 |
| 7,461,559 B2 | * | 12/2008 | Takizawa ....................... 73/777 |

FOREIGN PATENT DOCUMENTS

JP        11230981 A    *    8/1999

\* cited by examiner

*Primary Examiner*—Lisa M Caputo
*Assistant Examiner*—Jermaine Jenkins
(74) *Attorney, Agent, or Firm*—Edell, Shapiro & Finnan, LLC

(57) ABSTRACT

A micromechanical pressure sensing device includes a silicon support structure, which is configured to provide a plurality of silicon support beams. The device further includes one or more diaphragms attached to and supported by the support beams, and at least one piezoresistive sensing device, which is buried in at least one of the support beams. The piezoresistive sensing device is arranged to sense a strain induced in the silicon support structure, the strain being induced by a fluid in contact with the one or more diaphragms, to determine the pressure acting on the one or more diaphragms.

8 Claims, 7 Drawing Sheets

MICROMECHANICAL PRESSURE SENSING DEVICE

CROSS REFERENCE TO RELATED APPLICATIONS

This application claims priority under 35 U.S.C. §119 to Application No. EP 07101491.4 filed on Jan. 31, 2007, entitled "Micromechanical Pressure Sensing Device," the entire contents of which are hereby incorporated by reference.

FIELD OF THE INVENTION

The present invention relates to a micromechanical pressure sensing device, in particular a micromechanical support structure with a built-in pressure sensor.

BACKGROUND

It is common practice to measure the pressure over a filter or a semi-permeable diaphragm in liquid handling systems, in order to monitor for clogging, disruption or other types of filter failure. It is also common practice to use pressure sensors to measure the pressure difference over an osmotic diaphragm (osmotic pressure). Pressure sensing is also used to monitor for clogging, disruption or other types of filter failure in gas handling systems.

Such measurements can be performed by using a differential pressure sensor with ports to each side of the diaphragm or with two absolute pressure sensors, each of them with inlet ports from each side of the diaphragm to be monitored.

Pressure measurement in the above known systems is typically done by separate sensors, which in the case of liquid media are costly and include bulky transducers with stainless steel fronts. The pressure over the diaphragm is calculated by measuring the line-pressure on each side of the diaphragm or by building a differential pressure sensor with pressure inlets to the liquid volumes on each side of the diaphragm. Such differential pressure sensors are particularly demanding and costly to make.

In small liquid systems such as micro-fluidic devices or lab-on-chip solutions and small gas handling systems, separate pressure sensors in the form of packaged devices take up a large volume of space and are often therefore ineffective or impossible to use.

Very thin diaphragms require support structures. In order to build a thin diaphragm that covers a relatively large area it is common practice to build the complete diaphragm as a matrix of many relatively small diaphragms supported by an array or matrix of support beams, in order to make the total structure strong enough to withstand a pressure induced over the diaphragm.

SUMMARY

According to the present invention there is provided a micromechanical pressure sensing device comprising:

a silicon support structure, configured to provide a plurality of silicon support beams;

one or more diaphragms attached to and supported by the support beams; and at least one piezoresistive sensing device, buried in at least one of the support beams, the piezoresistive sensing device being arranged to sense a strain induced in the silicon support structure, the strain being induced by a fluid in contact, in use, with the one or more diaphragms, in order to determine the pressure acting on the one or more diaphragms.

The present invention provides a system that uses silicon support structures for thin diaphragms by building pressure-sensing piezoresistive devices into these support structures, thereby allowing direct measurement of the differential pressure over a large variety of diaphragms without the need for external sensors. By using buried conductors and buried resistors, high stability pressure sensors with good media compatibility for both sides of a flexible structure can be used to ensure good long term stability and high reliability.

The present invention measures the pressure over one or more diaphragms without needing an external or exposed sensing element. There is also no need to measure the line-pressure on each side of the diaphragm. The sensor of the present invention is an integral part of the diaphragm, and hence its fast response time allows detection of fast dynamic changes in pressure. The sensor being an integral part of the diaphragm's mechanical support structure also results in a sensing system of reduced size and lower cost than current systems, and is additionally more robust. An additional advantage is that no extra mechanical arrangements are needed to assemble external sensors.

Piezoresistors can be built into any rigid or flexible single-crystal silicon structure, making the measurement of strain in the structure or the pressure between two sides of a structure using a piezoresistive sensing structure possible. The diaphragm material can be single-crystal silicon, poly-silicon, silicon nitride or other thin-film material. Applications where the invention can be employed include: filters with holes in the micrometer or nanometer range; osmotic semi-permeable diaphragms with pores or holes in the nanometer range; and active micro-fluidic devices with filters or semi-permeable diaphragms which form part of a larger system.

The present invention makes it possible to build filters and diaphragms with holes and/or pores in the nanometer range directly on standard silicon substrates. The invention can easily be implemented in silicon process laboratories.

The present invention can be used to measure the pressure over diaphragms made of any material compatible with silicon process technology.

The above and still further features and advantages of the present invention will become apparent upon consideration of the following definitions, descriptions and descriptive figures of specific embodiments thereof, wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

Examples of the present invention will now be described in detail with reference to the accompanying drawings, in which:

FIG. 2b shows a cross-sectional view, along line A-A, of the device of FIG. 2a;

FIG. 4b shows a cross-sectional view, along line B-B of the device of FIG. 4a;

DETAILED DESCRIPTION

Figures 1A, 1B:
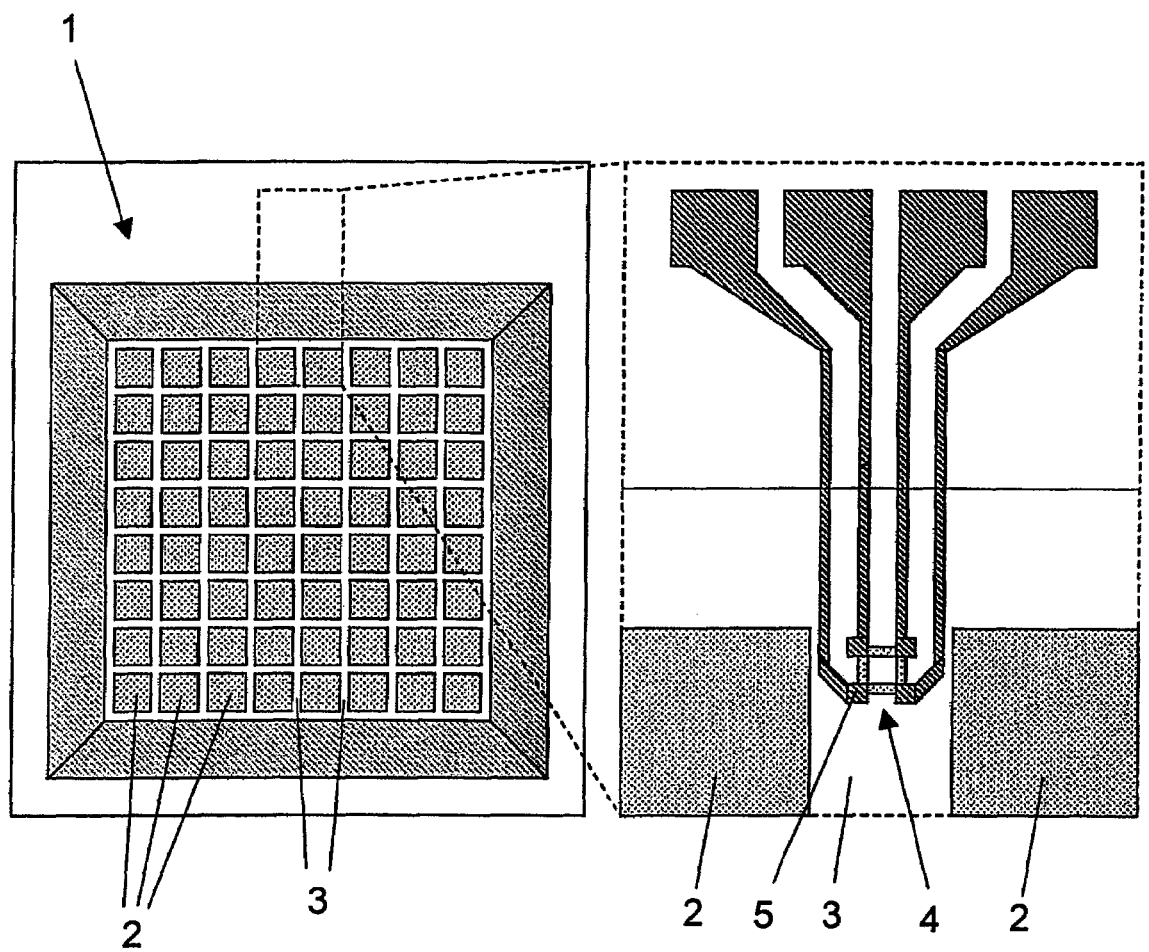
FIGS. 1a and 1b show rear and front side plan views, respectively, of a micromechanical pressure sensing device according to the present invention.

FIGS. 1a and 1b show a micromechanical pressure sensing device according to an embodiment of the present invention in the form of a micro-filter or a semi-permeable diaphragm having 8×8 separate units supported on beams of single-crystal silicon, as described further below.

FIG. 1a shows a plan view of a multi-element matrix of thin diaphragms 2 on a raster of flexible silicon beams 3 which form a silicon frame. Although a regular array is shown, the frame may be made of any suitable shape and arranged according to the positioning and/or use of the device 1. FIG. 1b shows a plan view of two thin diaphragm areas of the device of FIG. 1a and a piezoresistive Wheatstone bridge 4 including a plurality of resistors 5, linked by electrically conductive interconnection lines of, for example, aluminum, built into one of the supporting silicon beams 3.

The piezoresistive Wheatstone bridge 4, including its electrical interconnections, is built into one of the beams 3 that form the single-crystal frame and is suitably positioned during manufacture to allow accurate and efficient pressure measurement via resistors 5, which sense a strain induced in the silicon beams by a fluid acting on the diaphragm. The support beams 3 are typically designed to withstand a higher pressure than the diaphragms. The bridge 4 can be used to continuously monitor the pressure over the structure as the pressure acting thereon causes a change in the strain induced, or alternatively pressure measurements can be taken at predetermined intervals or on demand.

Figure 2A:
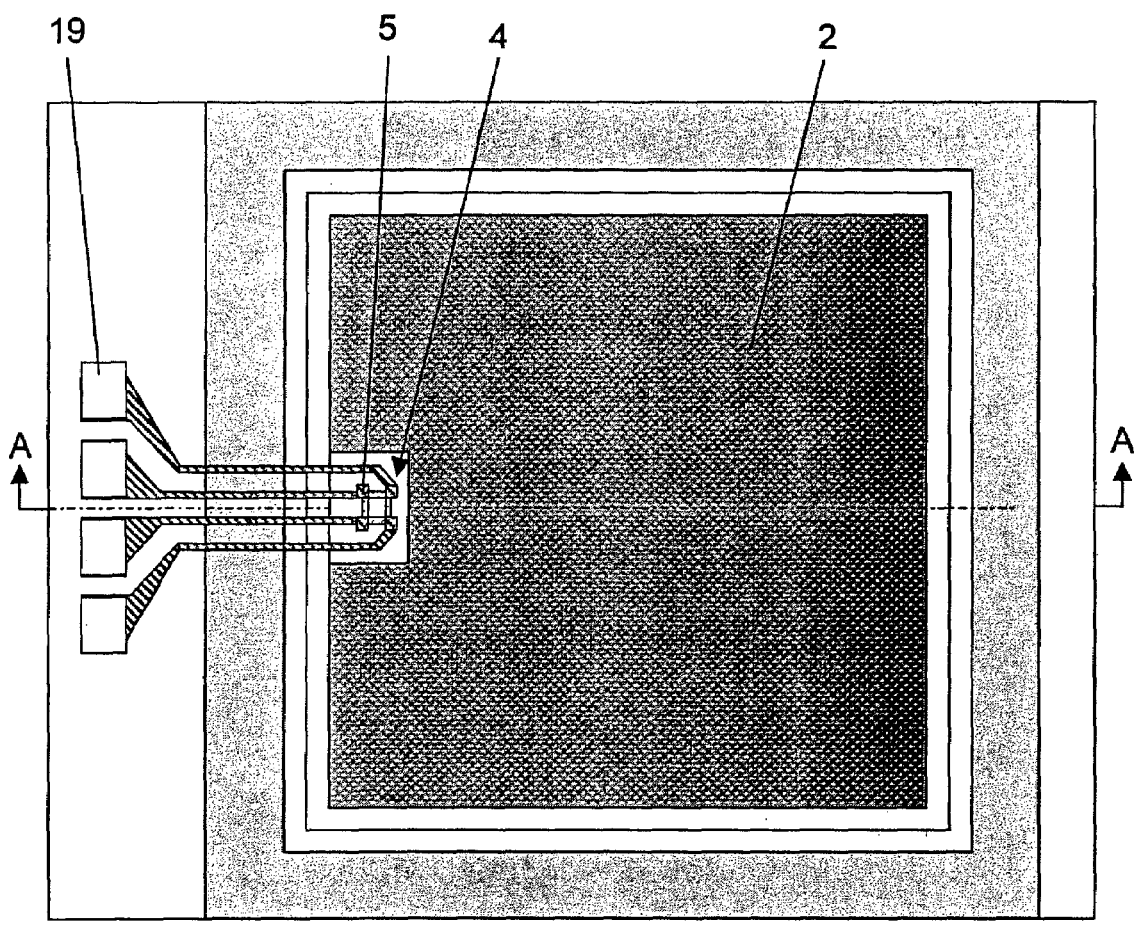
FIG. 2a shows a plan view of a further example of a micromechanical pressure sensing device according to the present invention.
Figure 2B:
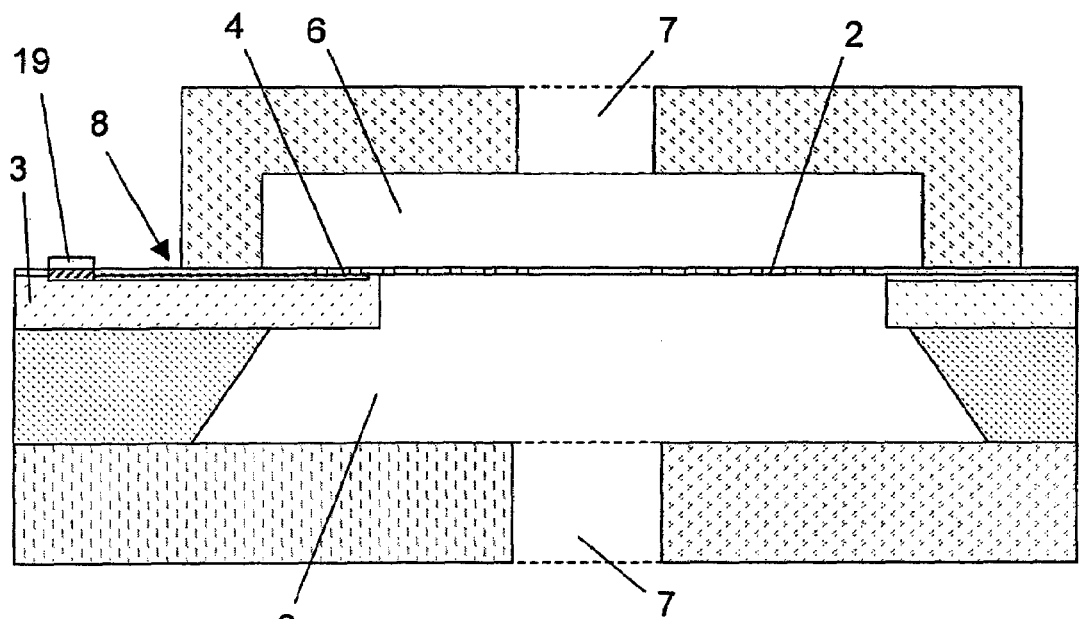

FIG. 2a is a plan view and FIG. 2b a cross-sectional view (along the line A-A of FIG. 2a) of one example of a pressure sensing device 1 with a semi-permeable diaphragm or micro-filter 2 that includes chambers 6 on either side thereof, in this case also with ports in the form of holes 7.

By using resistors 5 that are buried in the single-crystal silicon, the resistors are not influenced by surface charges or species in the liquid. This results in good long term stability of the pressure sensor. The use of diffused conductors that cross a sealing area 8 also provides high flexibility in allowing fluid volumes and caps to be provided on each side of the diaphragm. Other crossing structures are also feasible including the use of thin film conductors, in which case passivation is required over the conductors inside the chamber where fluids are handled. Electrical contact with the structure is possible via one or more metal contacts 19, as described further with reference to FIG. 5 below.

Figure 3:
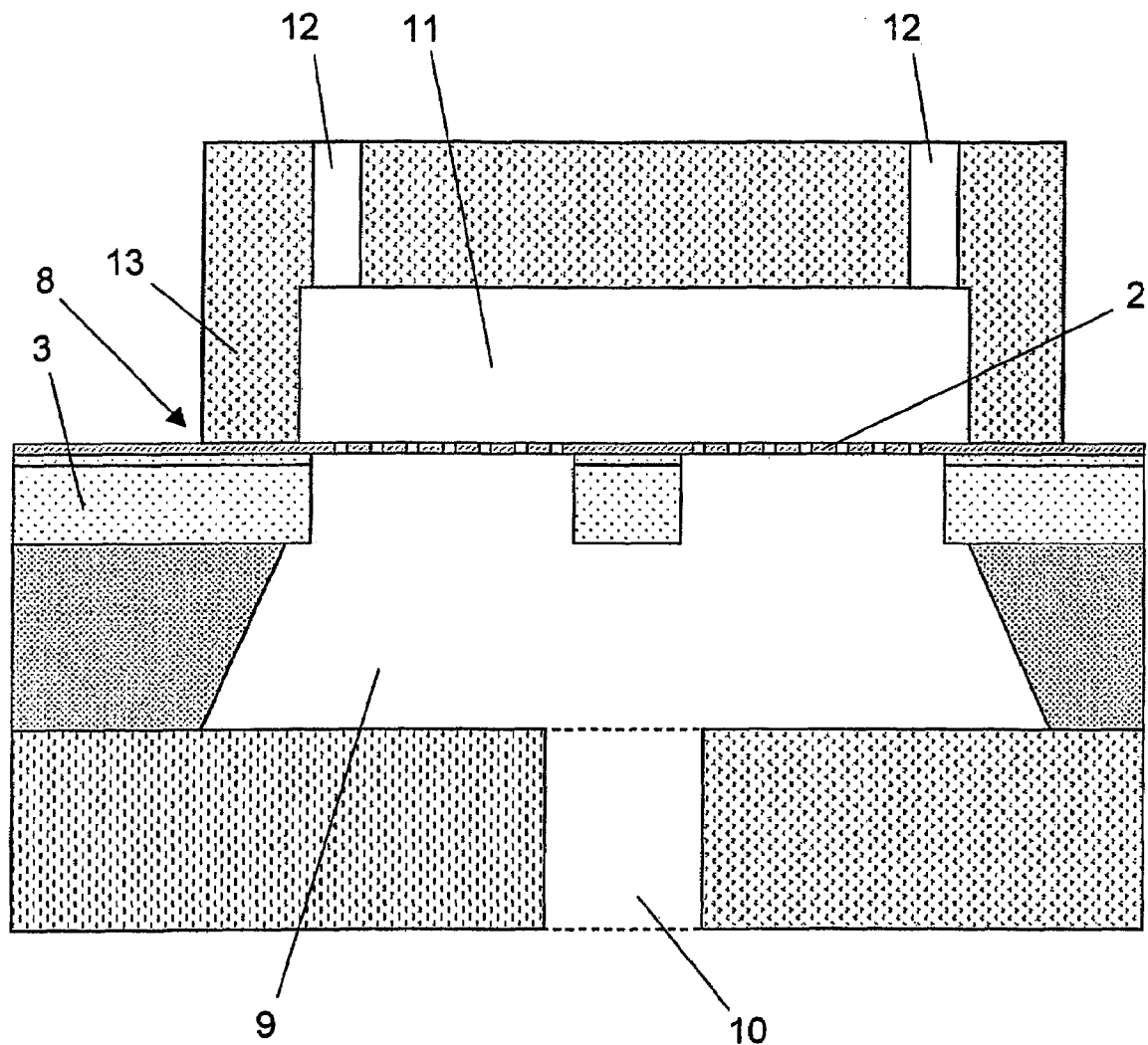
FIG. 3 illustrates a further example of a device according to the present invention that provides a chamber on either side of a diaphragm, this cross-section being orientated perpendicular to the view of the similar example of FIG. 2b.

FIG. 3 illustrates a device having two cavities which is generally similar to that of FIG. 2b, but which is a cross-sectional side view perpendicular to that of FIG. 2b. The device includes an upper structure 13 of, for example, anodically bonded glass. A first cavity 9 is for receiving a fluid of interest and has a media inlet hole 10, and a second cavity 11 is for receiving a reference volume of fluid. Inlet holes 12 for the reference volume can be sealed after filling the second cavity 11.

Figure 4A:
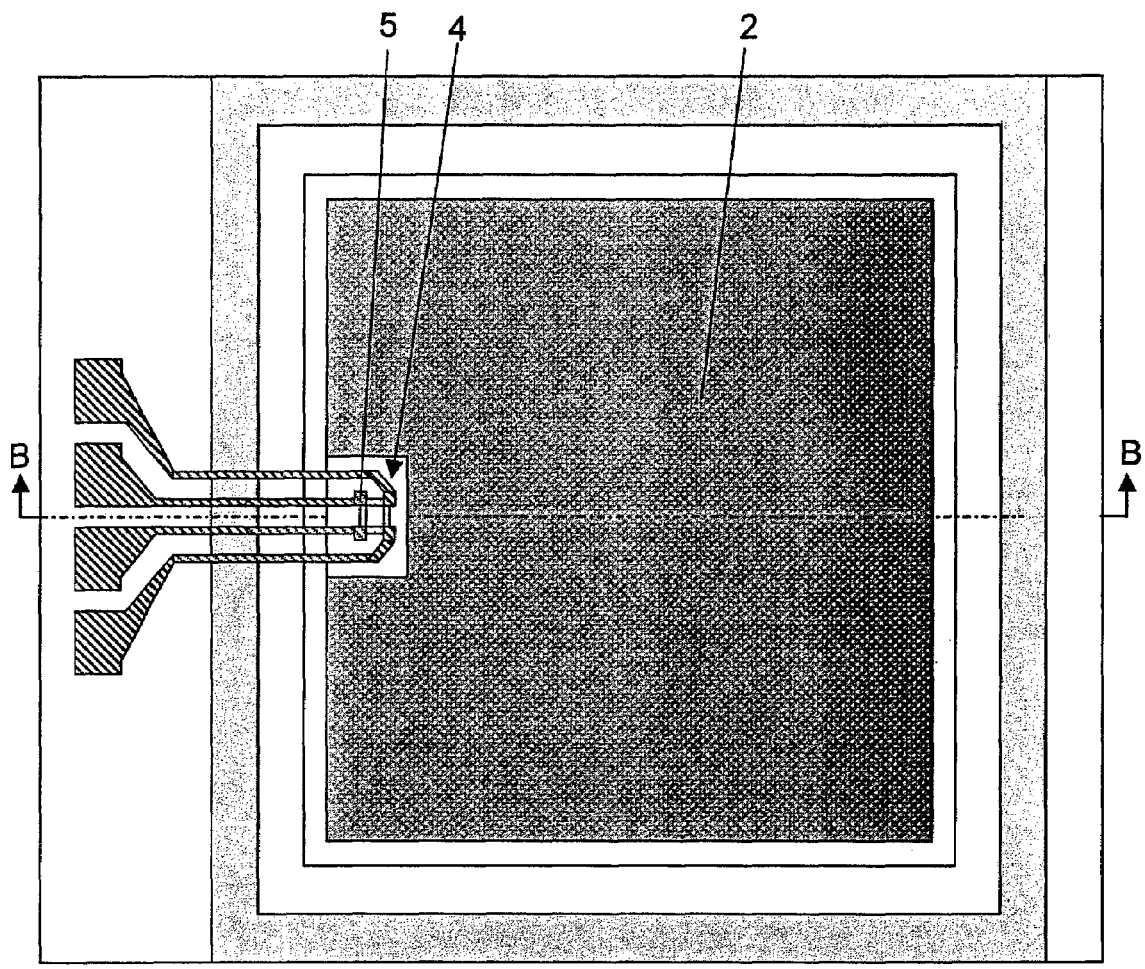
FIG. 4a shows a plan view of a further example of a micromechanical pressure sensing device according to the present invention.
Figure 4B:
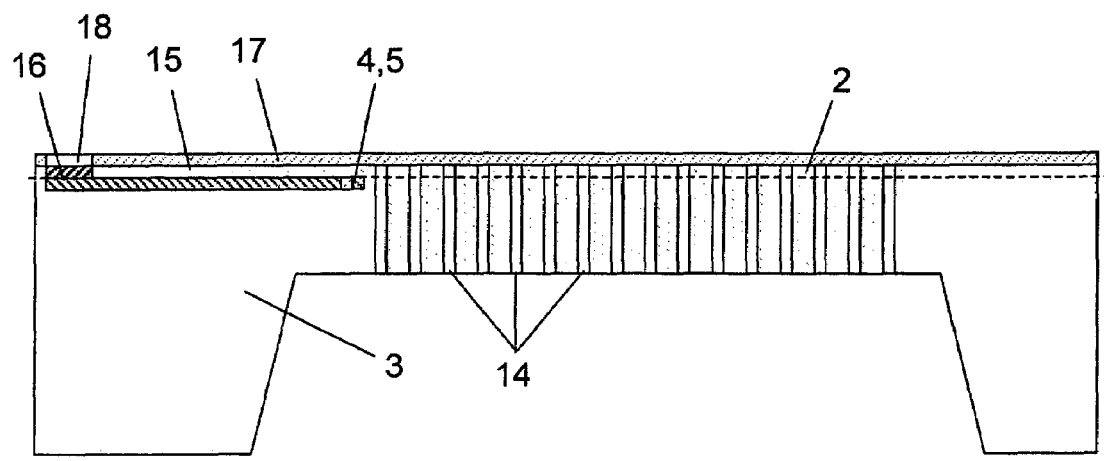

FIGS. 4a and 4b show a further example of a micromechanical pressure sensing device, FIG. 4b being a cross-sectional view along the line B-B of FIG. 4a. Through-holes 14 can extend through the silicon frame, which can be etched to provide a diaphragm of a desired thickness. An epitaxial layer 15 is grown in order to bury a conductive element 16, while a passivation layer 17 is provided to protect the buried resistors 5 and buried conductor 16 from external influences. A gap 18 in the passivation layer can allow electrical contact to be made with the sensor.

Figure 5:
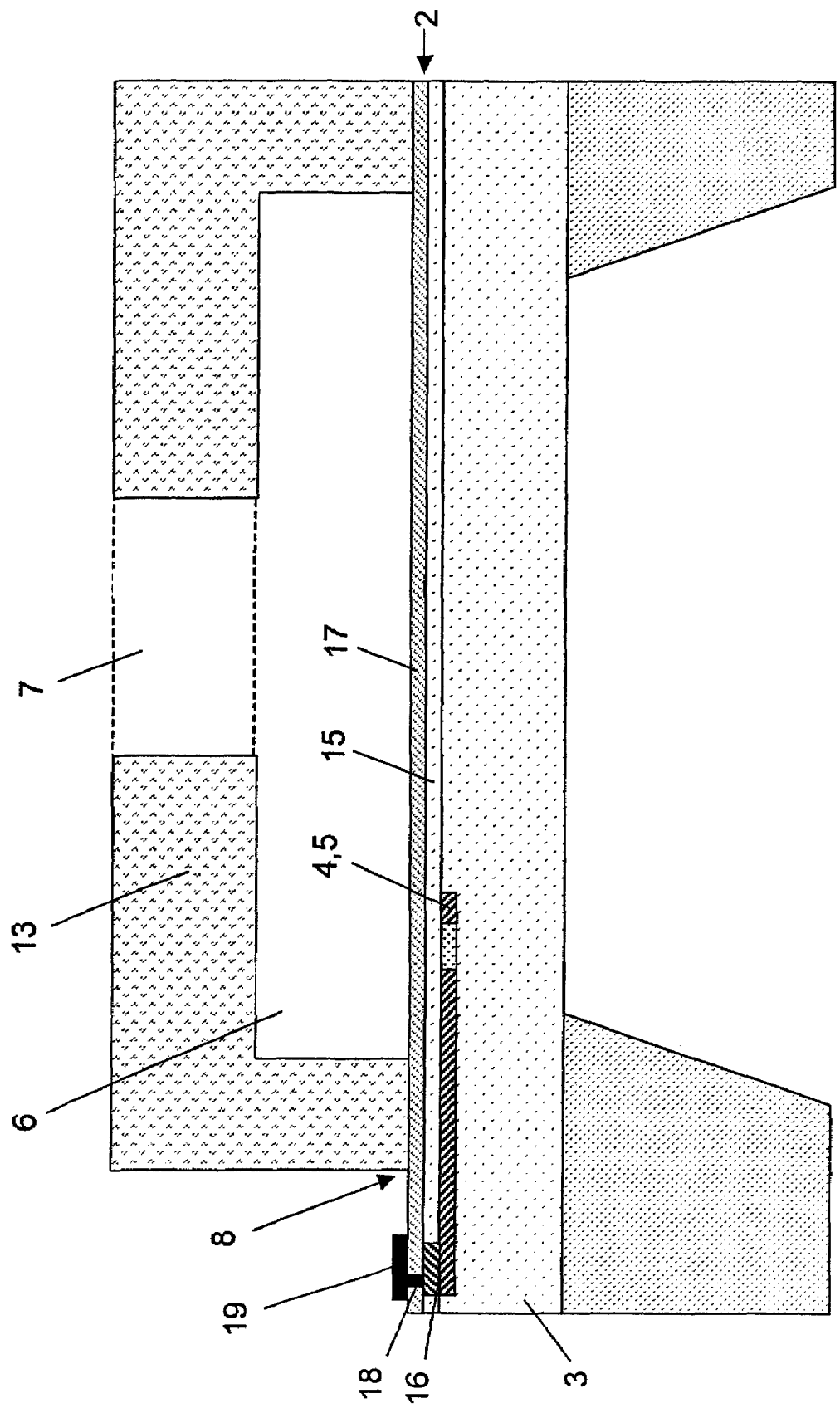
FIG. 5 shows a cross-sectional view of the use of a buried conductor for crossing a seal area of a micromechanical pressure sensing device according to the present invention.

FIG. 5 shows a further example of a structure having a buried conductor 16 for crossing a seal area 8 of an anodically bonded glass structure 13 having an inlet port or hole 7. An electrical connection is established between electrical contact (s) 19 and the buried resistors 5. The use of buried conductors 16 and resistors 5 isolates the PN-junction of each of the buried conductors 16 and the resistors 5 under the epitaxial layer 15, and protects them from the influence of the ions from the glass 13 that is anodically bonded to the diaphragm structure. Anodic bonding is a well-known process in which a silicon wafer and a glass wafer (or a wafer of another material that is sputtered with glass) are placed in contact with one another on a heated surface and aligned as desired. When this two-wafer structure is heated to a temperature in the range of approximately 300° C. to 450° C., positive ions, such as sodium ions, in the glass will be mobile and will drift under the influence of an electric field by enforcing a voltage from a power supply (one terminal of which contacts one wafer, and the other terminal of which contacts the other wafer) over the glass. The positive ions in the glass will drift towards the interface at the silicon wafer, building up an electric field at the interface region, and also creating an electrostatic force that pulls the two wafers together into intimate contact at the atomic level. After cooling, the ions lose their mobility, but the electrostatic force partly remains and holds the wafers together in atomic contact, providing a high-strength, durable bond between the wafers.

Figure 6A:
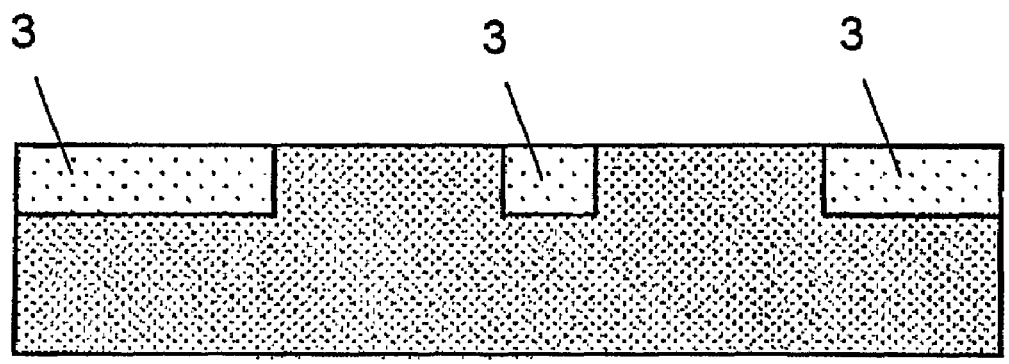
FIGS. 6a to 6c show cross-sectional views of a diaphragm area of a device according to the present invention at various stages of manufacture.
Figure 6B:
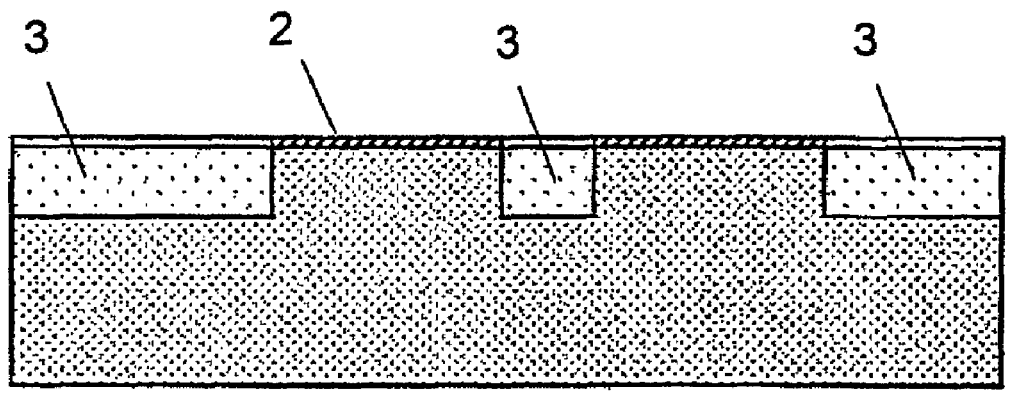
Figure 6C:
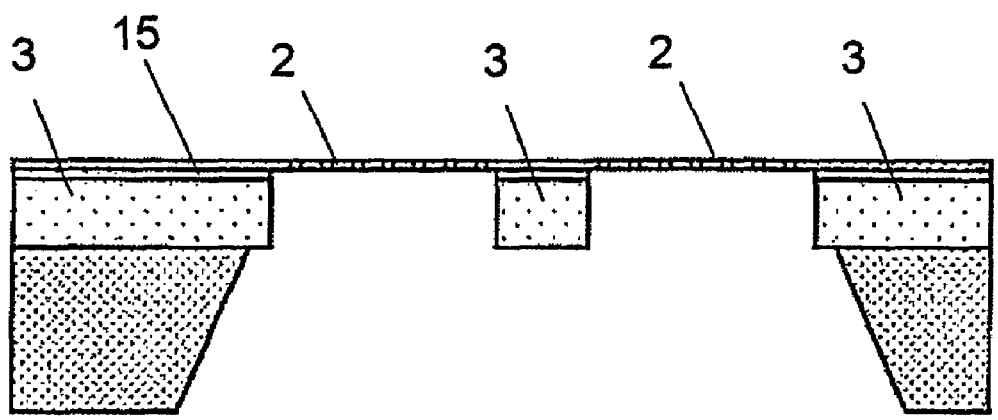
Figure 7A:
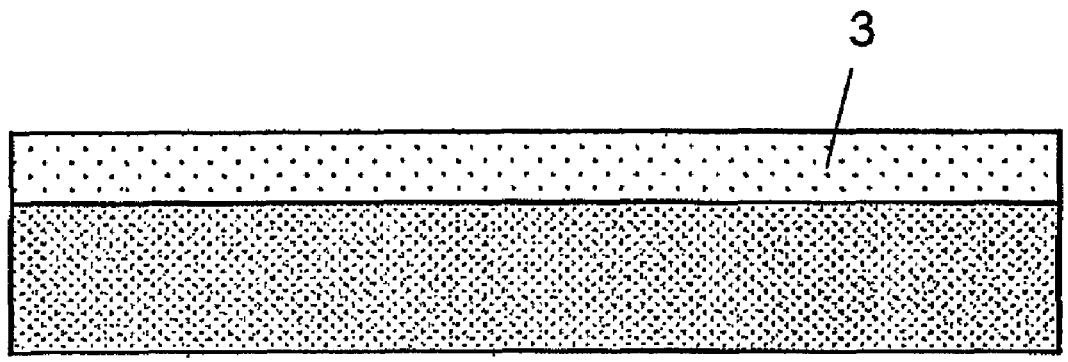
FIGS. 7a to 7c show cross-sectional views (orientated perpendicular to the views of FIGS. 6a to 6c) of a diaphragm area of a device according to the present invention at various stages of manufacture.
Figure 7B:
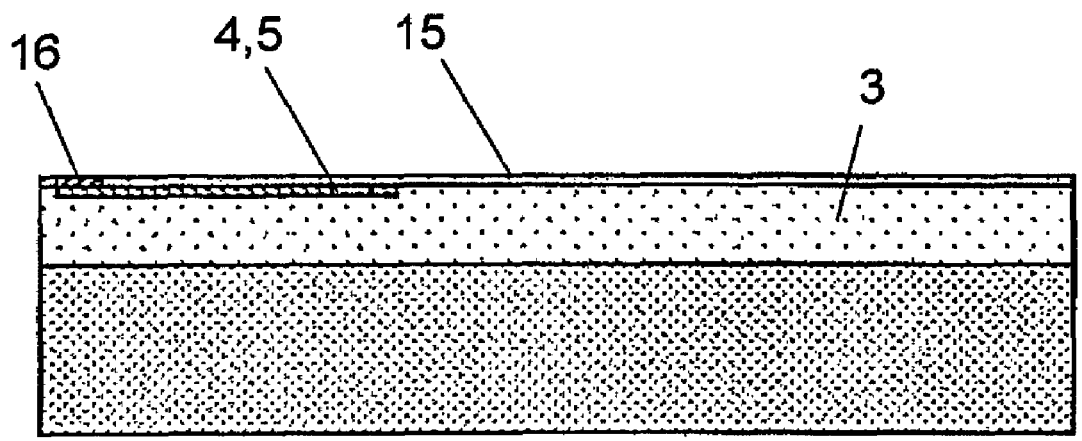
Figure 7C:
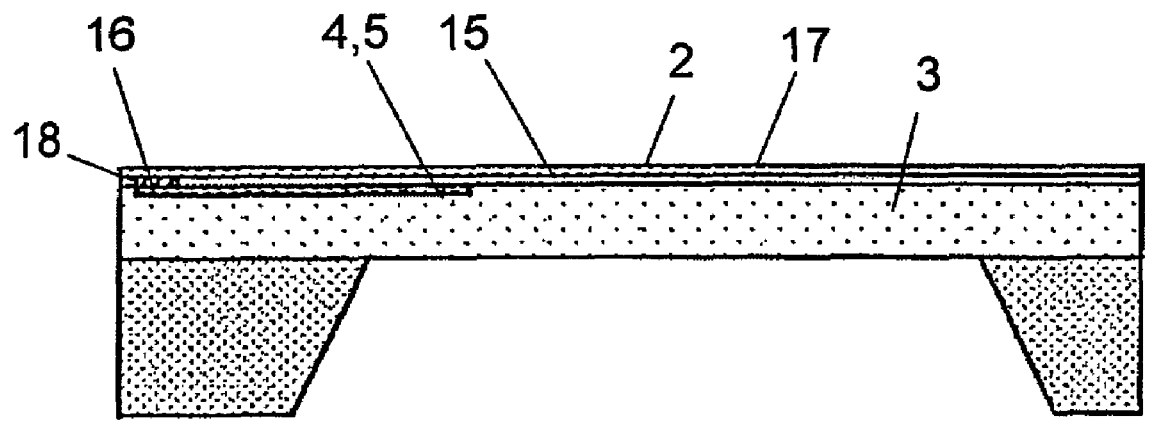

FIGS. 6 and 7 show some of the main steps in manufacturing structures according to the invention; FIGS. 6a to 6c shows a cross-section of the diaphragm area at various stages of manufacture and FIGS. 7a to 7c show a cross-section of the sensor area at various stages of manufacture. Processing starts with, for example, an N-type 100 single crystal substrate etched to provide beams 3 (FIG. 7a). A first photoresist mask step defines buried conductors 16 (FIG. 7b) which are formed by ion implantation of, for example, boron using a photoresist as a mask layer and followed by a drive-in diffusion step. This results in surface doping of insulated P-areas for the crossings without any steps in the surface as the location of the PN-junctions. An epitaxial N-type layer 15 is then grown (FIG. 7b), thereby burying the conductor in single crystal silicon and providing protection from surface effects. P-type contacts are then formed where appropriate on the buried P-type conductor by photomasking and doping. A passivation layer 17 is provided over the contacts (FIG. 7c). Contact holes 18 are made at an appropriate position through this passivation layer, and metal interconnection members 19 (not shown, see FIG. 5) are provided in connection therewith. A diaphragm 2 is then formed by selectively etching the substrate. The structure can then be anodically bonded to a glass member or a second silicon member with sputtered glass, as described above.

While the invention has been described in detail with reference to specific embodiments thereof, it will be apparent to one of ordinary skill in the art that various changes and modifications can be made therein without departing from the spirit and scope thereof. Accordingly, it is intended that the present invention covers the modifications and variations of this invention provided they come within the scope of the appended claims and their equivalents.

What is claimed is:

1. A micromechanical pressure sensing device, comprising:
   a silicon support structure including a plurality of silicon support beams;
   at least one diaphragm attached to and supported by the support beams; and
   at least one piezoresistive sensing device, buried in at least one of the support beams,
   the piezoresistive sensing device being arranged to sense a strain induced in the silicon support structure, the strain being induced by a fluid in contact with the at least one diaphragm, to determine a pressure acting on the at least one diaphragm.

2. The device according to claim 1, wherein the piezoresistive sensing device comprises a piezoresistive Wheatstone bridge.

3. The device according to claim 1, the at least one diaphragm comprising a plurality of diaphragms arranged in an array, each diaphragm being separated from each of its adjacent diaphragms by one of the plurality of support beams.

4. The device according to claim 1, wherein the diaphragm is semi-permeable.

5. The device according to claim 1, wherein the diaphragm is arranged to act as filter.

6. The device according to claim 1, wherein the silicon support structure comprises at least one of: single-crystal silicon, poly-silicon, and silicon nitride.

7. The device according to claim 1, further comprising:
   a first cavity for receiving a first fluid that contacts one surface of the one or more diaphragms; and
   a second cavity for receiving a reference fluid that contacts the other surface of the one or more diaphragms, the piezoresistive sensing device being arranged to sense the strain induced in the silicon support structure by the first fluid.

8. The device according to claim 1, wherein the piezoresistive sensing device is further arranged to determine the osmotic pressure of the fluid.

\* \* \* \* \*